United States Patent
Eckert et al.

(10) Patent No.: US 6,622,076 B1
(45) Date of Patent: Sep. 16, 2003

(54) METHOD AND DEVICE FOR MONITORING OR FOR INFLUENCING THE MOVEMENT OF A VEHICLE ON A PATH

(75) Inventors: Alfred Eckert, Mainz (DE); Lutz Marczinski, Karben (DE); Peter Schramm, Frankfurt (DE); Walter Hagleitner, Bregenz (AT)

(73) Assignee: Continental Teves, AG & Co. OHG, Frankfurt (DE)

( * ) Notice: Subject to any disclaimer, the term of this patent is extended or adjusted under 35 U.S.C. 154(b) by 0 days.

(21) Appl. No.: 09/937,758
(22) PCT Filed: Apr. 5, 2000
(86) PCT No.: PCT/EP00/03007
§ 371 (c)(1),
(2), (4) Date: Feb. 11, 2002
(87) PCT Pub. No.: WO00/61413
PCT Pub. Date: Oct. 19, 2000

(30) Foreign Application Priority Data

Apr. 12, 1999 (DE) .......................................... 199 16 267

(51) Int. Cl.$^7$ ................................................. G06F 7/00
(52) U.S. Cl. ............................................. 701/70; 701/72
(58) Field of Search .............................. 701/70, 78, 27, 701/23, 72

(56) References Cited

U.S. PATENT DOCUMENTS 5,634,698 A    6/1997    Cao et al.

FOREIGN PATENT DOCUMENTS

| DE | 195 15 055 | 5/1996 |
|----|------------|--------|
| DE | 197 51 067 | 5/1997 |
| DE | 195 28 457 | 6/1997 |
| DE | 197 02 383 | 8/1997 |
| EP | 0 527 665  | 2/1993 |

Primary Examiner—Yonel Beaulieu

(57) ABSTRACT

A method for monitoring or influencing the movement of a vehicle on a path determines a desired path and an actual movement of the vehicle, performs a comparative analysis of the desired path and the actual movement, and transmits by haptic means an information variable according to the result of the comparative analysis to the driver of the vehicle, or controls at least one wheel brake according to the result of the comparative analysis.

26 Claims, 6 Drawing Sheets

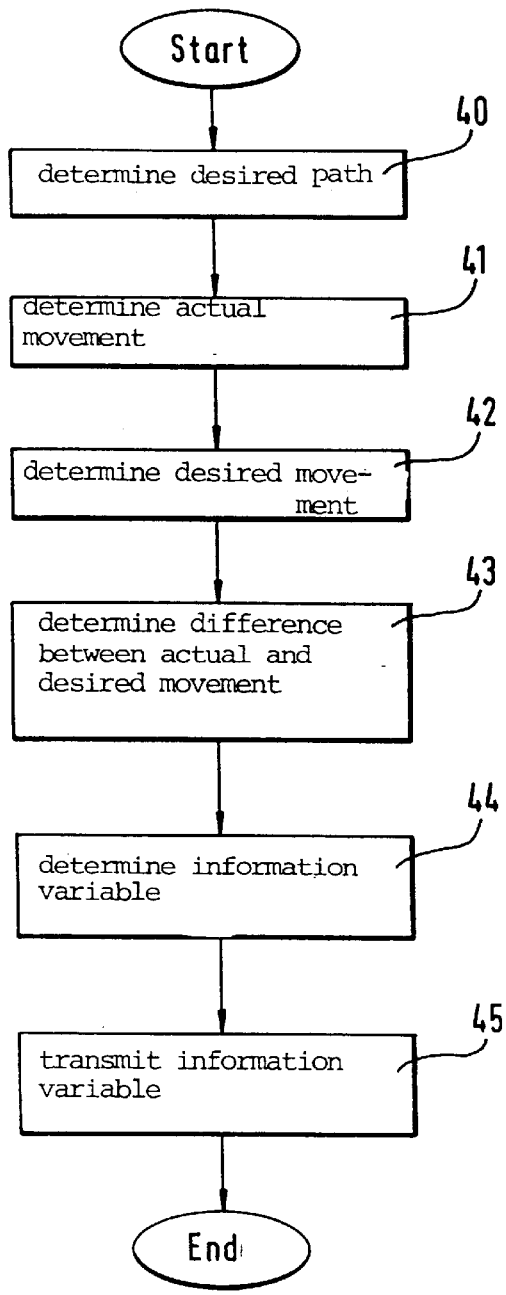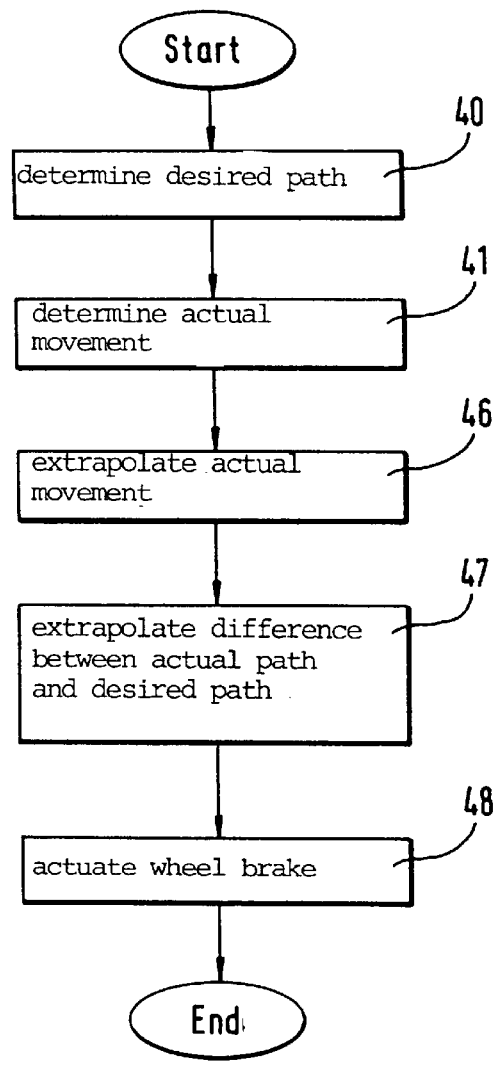
Fig. 4a
Fig. 4b

METHOD AND DEVICE FOR MONITORING OR FOR INFLUENCING THE MOVEMENT OF A VEHICLE ON A PATH

CROSS REFERENCE TO RELATED APPLICATION

This specification claims priority to German Patent Application No. 199 16 267.0, filed on Apr. 12, 1999 and PCT/EP00/03007, filed on Apr. 5, 2000.

BACKGROUND OF THE INVENTION

The present invention relates to a method and a device for monitoring or for influencing the movement of a vehicle on a path.

The driver controls the movement of a vehicle according to a path to be followed. This is mainly done by way of the steering system of the vehicle. If the driver is inattentive, the vehicle can escape from the path. Different, so-called 'lane-keeping systems' which intervene directly into the steering of a vehicle to counteract this tendency are known in the art. In these systems, e.g. the housing of the steering gear is displaced, or an additional steering torque is applied to the steering system by way of an electric motor. It is, however, disadvantageous in these systems that the steering system no longer reacts as the driver is used to or desires. The result is that the driver can no longer govern the vehicle completely.

In view of the above, an object of the present invention is to disclose a method and a device for monitoring or influencing the movement of a vehicle on a path which does not intervene into the steering system of the vehicle, with the driver maintaining full control over the vehicle.

SUMMARY OF THE INVENTION

The method for monitoring or influencing the movement of a vehicle on a path first of all includes determining a desired path to be followed by the vehicle. This determination may be effected by way of appropriate optical sensors, such as infrared sensors or a video camera which, for example, detect the roadway tracks or a vehicle driving in front, and forward corresponding signals, for example, to an image processing system determining therefrom the desired path, such as the space coordinates with respect to the vehicle coordinates. The desired path can be a local position, a sequence of dots, a vector, or a trajectory.

Further, the actual movement of the vehicle is determined. This may refer to the steering angle, the yaw velocity, or the transverse acceleration, that means, the respective components about the vertical axis of the vehicle, or also corresponding components in the longitudinal vehicle direction. Thus, the actual movement can depend on a number of parameters or may have several components. The sensor means required to determine the actual movement can be provided by a known ESP sensor system (Electronic Stability Program).

Thereafter follows a comparative analysis of the desired path and the actual movement which may preferably be performed in two ways: on the one hand, a desired movement can be determined from the desired path which the vehicle is to perform for maintaining the desired path. Subsequently, a comparison can be made between the desired movement and the actual movement which furnishes a difference in movement as a result. Another possibility involves extrapolating from the actual movement an 'actual path' which the vehicle would follow due to the actual movement. Subsequently, a comparison can be made between the desired path and this actual path which furnishes a difference in path as a result.

The present invention offers two possibilities of utilizing the result of the comparative analysis.

During monitoring the movement of a vehicle an information variable is determined on the basis of the difference (result) and forwarded to the driver of the vehicle by haptic means, meaning through physical including tactile means. This is preferably done by way of the steering wheel of the vehicle, thereby communicating in a tactile manner through the hands of a driver which are generally very sensitive. The information variable can provide a proposal of direction for steering of the vehicle so that the driver receives a hint as to steering the vehicle towards the desired path. Besides, the information variable can furnish a proposal for the intensity, i.e., the speed of steering. Thus, the driver is e.g. required to countersteer the more (the faster) the vehicle deviates from the desired path. Also, it must be taken into account that the desired path determined not always is the ideal path or the path the driver wishes to follow. Therefore, it is up to the driver to utilize the information transmitted to him/her in order to guide the vehicle to the desired path or to steer the vehicle to any other path desired.

At least one wheel brake is actuated according to the difference when influencing the movement of a vehicle is intended. The said wheel brake is preferably a wheel brake on the front axle of the vehicle because there the portion of the entire braking effort of the vehicle roughly amounts to 70 to 80%. Preferably, the brake pressure on the wheel brake is increased to steer the vehicle into a different direction, for example, towards the desired path. When the vehicle has already slowed down, it is also possible to raise, the brake pressure on one wheel brake and to decrease the brake pressure on the other wheel brake of the same axle. Preferably, the decrease and the simultaneous increase of the brake pressure takes place so that the vehicle is not braked less than before.

Brake pressure increase can amount to less than 30 bar, and the speed of the brake pressure increase (brake pressure gradient) can range from 10 to 20 bar/s. The effect is that the driver senses only a slight steering deviation of the vehicle, yet the vehicle does not deviate substantially from its current path. The driver is thereby only informed that he/she is leaving the desired path determined. However, the driver is now as before able to fully control the vehicle and continue steering the vehicle as he/she desires.

When the driver is diverted and therefore leaves the desired path, it can be expedient to alarm him/her. This can be done by abrupt braking which can be achieved by a brake pressure gradient that exceeds 100 bar/s. This causes the vehicle to be braked to a stronger extent for a brief interval which is unpleasant to the driver so that upon receiving this tactile input, he/she 'wakes up' and pays attention to the driving operation again.

Various embodiments of the present invention will now be explained in detail by way of the embodiments illustrated in the accompanying drawings.

BRIEF DESCRIPTION OF THE DRAWINGS

FIGS. 4a and 4b respectively show a flow chart of an embodiment of the method for monitoring or influencing the movement of a vehicle according to the present invention.

DETAILED DESCRIPTION OF THE INVENTION

Figure 1:
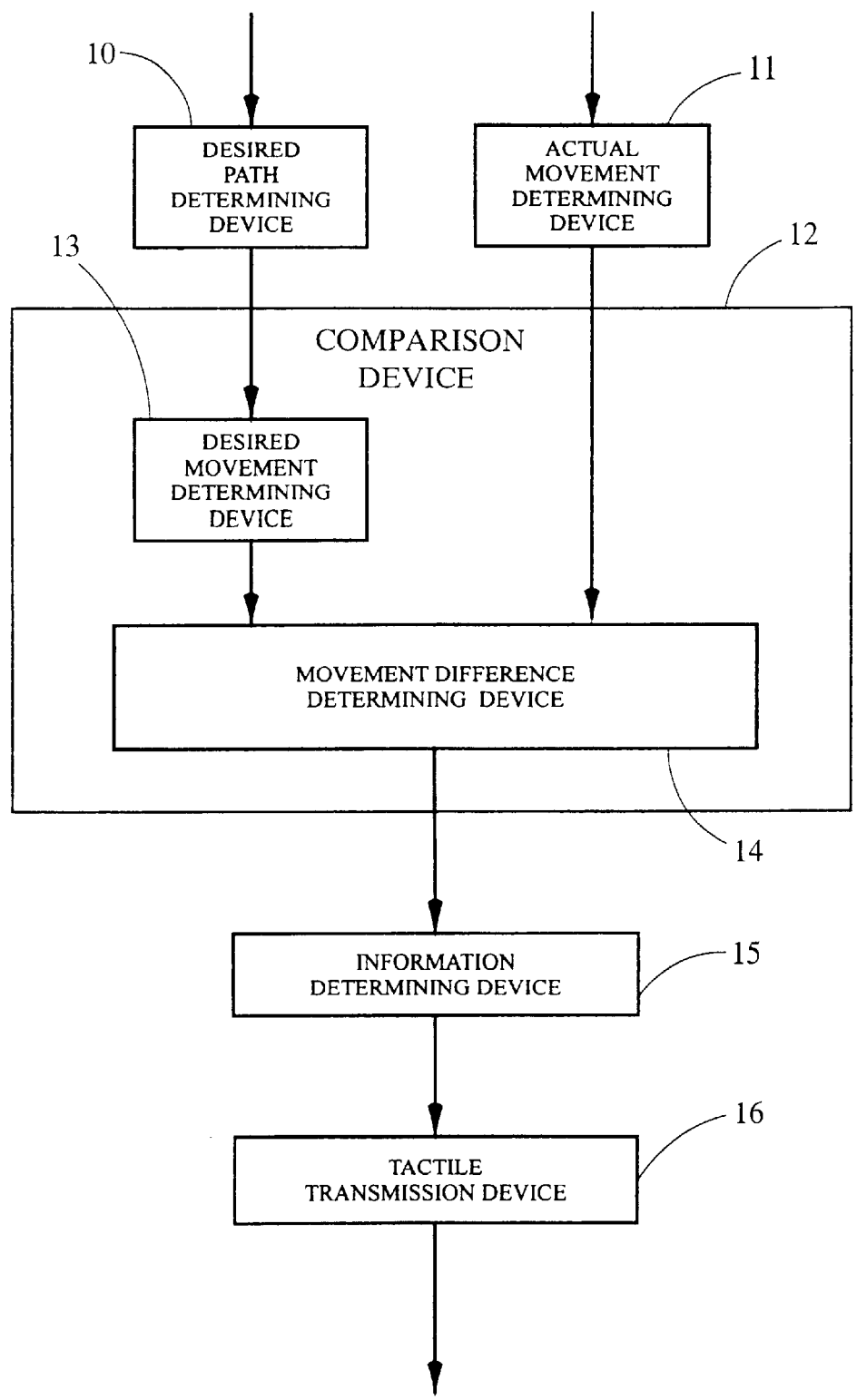
FIG. 1 is a block diagram view of an embodiment of the device for monitoring the movement of a vehicle according to the present invention.

FIG. 1 shows a block diagram of an embodiment of the device for monitoring the movement of a vehicle on a path according to the present invention. In a desired path determining device 10 a desired path is determined which the vehicle shall follow. The desired path determining device 10 can (as described hereinabove) include an optical sensor and, connected thereto, an evaluating device for evaluating one or more sensor signals.

The actual movement of the vehicle is determined in an actual movement determining device 11. This operation can be done by way of one or more wheel sensors, and/or a steering angle sensor, and/or an acceleration sensor, and/or a yaw rate sensor. Other components of other directions may also be taken into consideration.

The outputs of the desired path determining device 11 and the actual movement determining device 11 are connected to the inputs of a comparison device 12. Said device 12 performs a comparative analysis of the desired path determined in the desired path determining device 10 and the actual movement determined in the actual movement determining device 11. To render a direct comparison possible, the desired movement is first of all determined from the desired path in a desired movement determining device 13 which is connected to the desired path determining device 10 in this embodiment. Subsequently, the difference in movement between the desired movement and the actual movement is determined in a movement difference determining device 14. This difference in movement is used as an input quantity for an information determining device 15 which determines therefrom an information variable which, in turn, is transmitted to the driver by means of a transmission device 16. As described hereinabove, the information variable can relate to a direction for steering the vehicle towards the desired path and to the intensity of steering.

Figure 2:
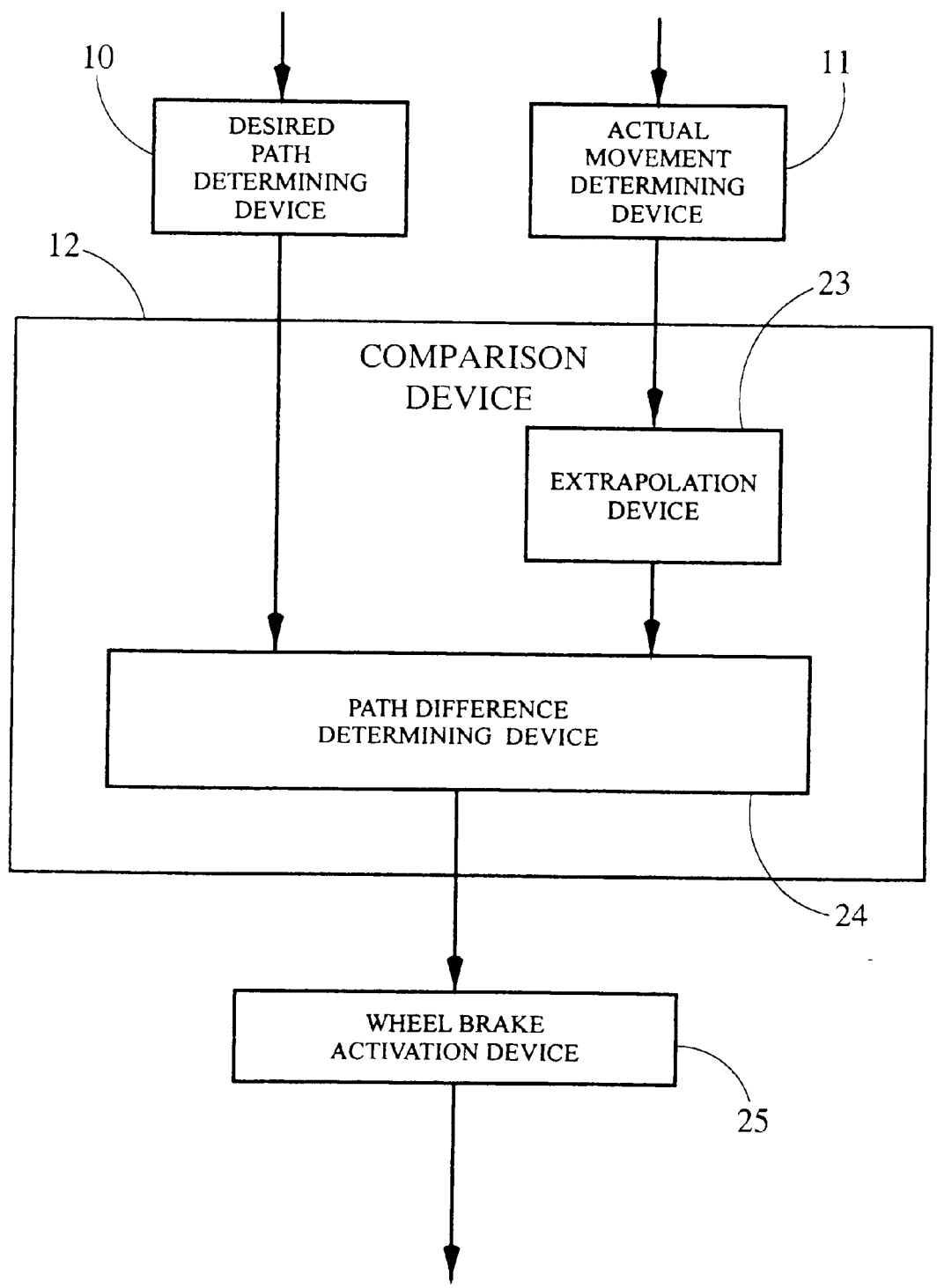
FIG. 2 is a block diagram view of ah embodiment of the device for influencing the movement of a vehicle according to the present invention.

FIG. 2 shows a block diagram of an embodiment of the device for influencing the movement of a vehicle on a path according to the present invention. The desired path determining device 10, the actual movement determining device 11, and the comparison device 12 correspond to those in FIG. 1 and, therefore, will not be described. In this embodiment, the comparison device 12 includes an extrapolation device 23 whose input is connected to the output of the actual movement determining device 11. The extrapolation device 23 extrapolates from the actual movement determined in the actual movement determining device 11 an extrapolated actual path on which the vehicle would move due to the actual movement when the actual movement determined is maintained. Thereafter, the determination of the difference in path between the actual path, and the desired path is effected in a path difference determining device 24. The result of the path difference determination is sent to a wheel brake actuation device which actuates one or more wheel brakes in response thereto.

The respective inputs and outputs of the devices in the FIGS. 1 and 2 can consist of several 'single lines' which, for simplification in the Figures, are plotted as one single 'line'. The comparison device 12 can be designed as described in FIG. 1 or in FIG. 2 for both devices according to the present invention. Other embodiments of the comparison device 12 which permit a comparative analysis are, however, also possible. The information determining device 15 and the wheel brake actuation device 25 are then configured accordingly to receive and process the comparison result signals.

Figure 3:
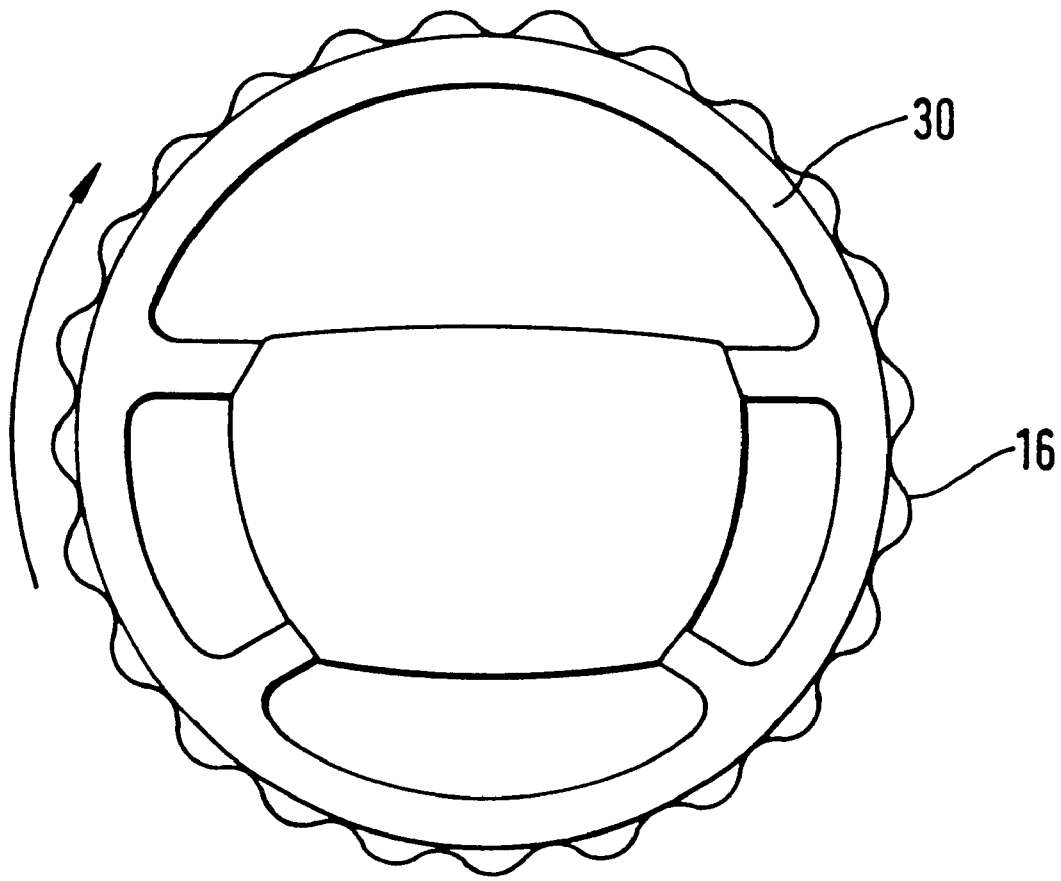
FIG. 3 is an embodiment of a transmission device of the present invention fitted to the steering wheel.

The transmission device 16 is preferably arranged on the steering wheel 30 of the vehicle. One example herefor is shown in FIG. 3. The determining device 16 is arranged around the outside ring of the steering wheel 30. The determining device 16 can have a piezoelectric foil which is wrapped accordingly aroung the steering wheel, or also an electrorheologic fluid, such as a gel, which varies its density in dependence on the applied voltage variation. The information variable may e.g. be transmitted by way of a wave propagating in one direction. This is indicated in FIG. 3 by the wave form of the transmission device 16. The wave moves in a circumferential direction of the steering wheel, for example, in the direction of the arrow. This can e.g. advise to the driver through a tactile input that he/she should steer the vehicle further to the right. For steering to the left, the wave would propagate counterclockwise. The amplitude and/or the frequency of the wave movement can inform the driver about how fast he/she should perform the steering movement. For example, a higher amplitude and/or frequency can mean a higher steering speed. The driver grips the steering wheel and, hence, the transmission device 16 and may, thus, feel the wave motion.

With a piezoelectric foil or an electrorheologic fluid (electric medium), the information variable which may contain several pieces of information (e.g. amplitude, frequency, direction), is conveyed as an electric quantity to the transmission device 16. In this operation, e.g. voltages are applied, distributed over the entire transmission device, which vary with time in response to the information variable, with the result of achieving a time variation of the density of the electric medium. This causes the medium to expand or compress which, thus, performs a wave motion.

The transmission device 16 may also include a hose which is filled with air, for example, and wherein the air is subjected to different pressures. This also permits producing a wave motion. Other media are also possible by which a steering direction and steering intensity can be indicated to the driver by mechanical means.

FIG. 4a shows a flow chart of an embodiment of the method for monitoring the movement of a vehicle on a path according to the present invention. Initially, the desired path is determined after the start in step 40. Thereafter, the actual movement is determined in step 41. The desired movement is determined from the desired path in step 42. Subsequently follows the determination of the difference in motion between the actual movement and the desired movement in step 43. In step 44, the information variable is determined corresponding to the difference determined in step 43 and is then transmitted haptically to the driver in step 45.

FIG. 4b shows a flow chart of an embodiment of the method for influencing the movement of a vehicle on a path according to the present invention. After the start, first the steps 40 and 41 are performed in this Figure, too. Thereafter, the actual path is extrapolated from the actual movement. The actual path is compared with the desired path in step 47, and the difference resulting therefrom in step 48 is used to actuate a wheel brake.

Figure 5:
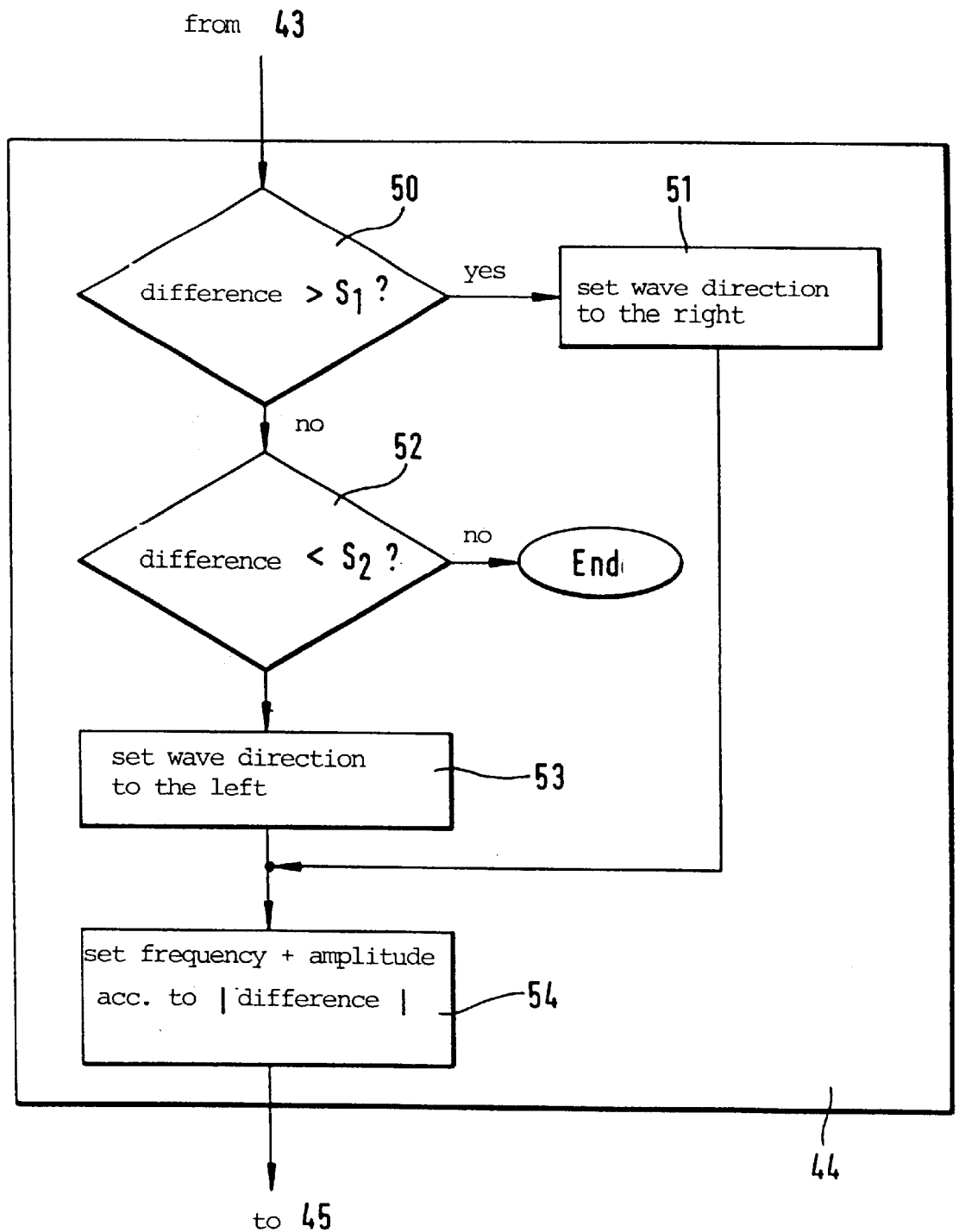
FIG. 5 is an exemplary flow chart for determining the information variable.

In FIG. 5, the step 44 for determining the information variable of FIG. 4a is defined in greater detail. Coming from step 43, first a polling is made in step 50 whether the difference between the actual movement and the desired movement exceeds a first threshold valve $S_1$. When this question is affirmed, the wave direction is set to the right in step 51. Then one proceeds to step 54. When the polling is negated in step 50, a polling is made in step 52 whether the difference is lower than a second threshold value $S_2$. When the polling is negated, the process is terminated. When the polling is affirmed in step 52, the wave direction is set to the left in step 53. Then the frequency and amplitude is determined according to the amount of the difference in step 54. Thereafter, the process is continued in step 45 of FIG. 4a.

Figure 6:
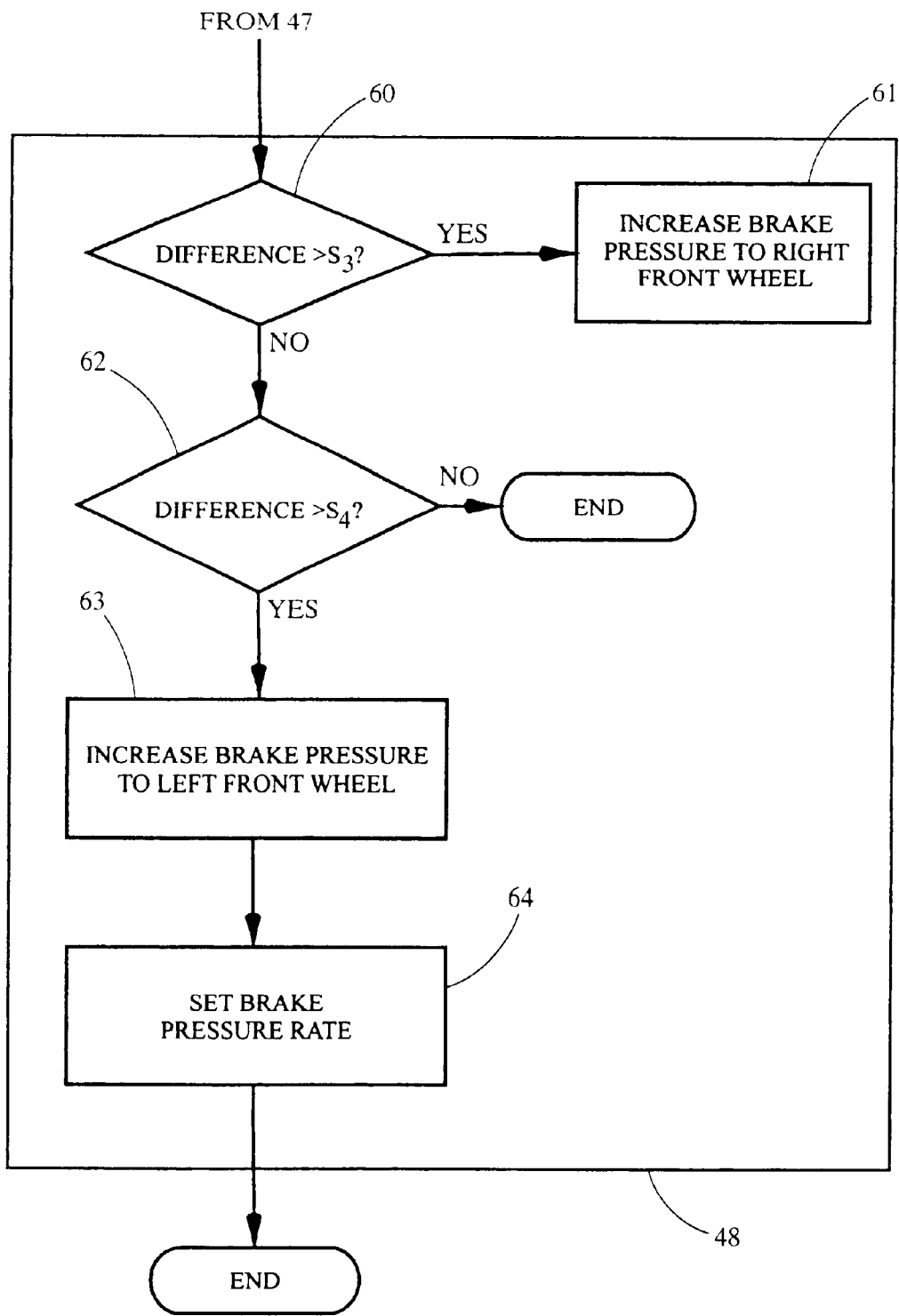
FIG. 6 is an exemplary flow chart for actuating a wheel brake.

Step 48 for the actuation of the wheel brake of FIG. 4b is explained in greater detail in FIG. 6. Coming from step 47, it is initially queried in step 60 whether the difference exceeds a third threshold value $S_3$. When this question is affirmed, the brake pressure for the right front wheel is increased in step 61. Then the process is continued in step 64. When the polling is negated in step 60, it is queried in step 62 whether the path difference is smaller than a fourth threshold value $S_4$. When this polling is negated, the process is terminated. However, in the affirmative of the polling, the brake pressure for the left front wheel is increased in step 63. Thereafter, the rate of brake pressure is set corresponding to the amount of the difference of the comparison in step 64. The process is then terminated.

A difference is respectively queried in FIGS. 5 and 6. This difference may be the difference in movement and the path difference. Accordingly, the threshold values $S_1$ to $S_4$ must be chosen. The threshold values should preferably be selected also in dependence on the permitted deviation between e.g. the actual movement and the desired movement. For example, a minor deviation may still be permitted which will not require brake intervention.

The meaning of steps 51 and 53 in FIG. 5 is such that not directly a wave is set into motion. Instead, only the direction is fixed in the beginning which, in step 54, along with the frequency and the amplitude is forwarded as information variable to step 45. The utilization of this information takes place only there.

The meaning of steps 61 and 63 of FIG. 6 is likewise such that, initially, it is only fixed on which front wheel the brake pressure is increased. Only in step 64 will the brake pressure be used on the corresponding wheel for braking with the determined rate of brake pressure.

The information variable can be determined by way of one or more fuzzy functions, and the wheel brake can be actuated in dependence on one or more fuzzy functions. In this case, the term 'fuzzy function' both means a fuzzification and a defuzzificatin. A fuzzy control seems appropriate because e.g. the determination of the desired movement from the desired path can lead to many results because there exist many possibilities to move the vehicle on the desired path. For example, the vehicle can be moved on the desired path at different speeds. This decision is normally taken by the driver who can determine the speed only inaccurately. Therefore, an attempt can be made in the desired movement determining device 13 to image the possible activities of a driver which guide the vehicle to the desired path. Advantageously, indefinite quantities or functions (fuzzy functions) can be chosen to this end. Equally, the information determining device 15 can determine by way of fuzzy functions an information variable for transmitting it to the driver from the difference determined in the movement difference determining device 14. The exact size (amplitude) of the information variable is of no importance, only a steering tendency needs to be indicated because the driver can only feel according to tendency and not absolutely.

Also, the extrapolation device 23 is required to determine the actual path only roughly from the actual movement, which makes fuzzy functions appropriate also for this purpose. Likewise, the actuation of the wheel brakes in the wheel brakes actuation device 25 can occur according to tendency so that also in this case it is advisable to determine the brake pressures by way of fuzzy functions.

However, the determination by way of fuzzy functions represents only one possibility among others.

It is important for the actuation of one or more wheel brakes that a tendency is passed on which the driver feels and which allows him/her to continue controlling the vehicle in conformity with his/her requests. This includes a 'wake-up' of the driver by a brief increase in the brake pressure so that the driver senses a jerk. This wake-up action, too, may only be done so that the driver will not get startled and, hence, will not lose control over his/her vehicle, not even for a short time.

What is claimed is:

1. A method for monitoring the movement of a vehicle on a path comprising the following steps:
   determining a desired path,
   determining the actual movement of the vehicle,
   comparative analysis of the desired path and the actual movement, and
   transmitting an information variable according to the result of the comparative analysis to the driver of the vehicle, the transmission being effected through a tactile input.

2. A method as claimed in claim 1 wherein the step of transmitting includes actuating at least one wheel brake according to the result of the comparative analysis.

3. A method as claimed in claim 1, wherein the comparative analysis includes the following steps:
   determining a desired movement for the vehicle according to the desired path, and
   determining a difference in movement between the desired movement and the actual movement, and the difference in movement represents the result.

4. A method as claimed in claim 1, wherein the comparative analysis includes the following steps:
   extrapolating an actual path according to the actual movement, and
   determining a path difference between the desired path and the extrapolated actual path, and the path difference represents the result.

5. A method as claimed in claim 1, wherein the comparative analysis is determined according to a fuzzy function, and the transmitting of the information is according to a fuzzy function.

6. A method as claimed in claim 1, wherein transmitting includes providing a tactile proposal of direction for steering the vehicle.

7. A method as claimed in claim 6, wherein the transmitting includes a proposal for the steering speed of the vehicle.

8. A method as claimed in claim 1, wherein the transmitting is effected by way of the steering wheel of the vehicle.

9. A method as claimed in claim 8, wherein the transmitting is performed by a wave which moves in a direction.

10. A method as claimed in claim 9, wherein the direction of the moving wave indicates the direction for steering.

11. A method as claimed in claim 9, wherein the amplitude and/or the frequency of the wave indicates the steering speed.

12. A method as claimed in claim 2, wherein the brake pressure is raised on one wheel brake, on the front axle of the vehicle.

13. A method as claimed in claim 12, wherein the brake pressure is decreased on the other wheel brake of the axle.

14. A method as claimed in claim 12, wherein the brake pressure increase amounts to less than 30 bar, and/or the gradient of the brake pressure increase is in the range of 10 to 20 bar/s.

15. A method as claimed in claim 2, wherein the wheel brake is actuated temporarily with a brake pressure gradient of more than 100 bar/s.

16. A method as claimed in claim 1, wherein the transmitting is prevented or discontinued when driving stability control is activated.

17. A device for monitoring the movement of a vehicle on a path comprising,
- a desired path determining device (10),
- an actual movement determining device (11),
- a comparison device (12) whose inputs are connected to the outputs of the desired path determining device (10) and the actual movement determining device (11),
- an information determining device (15) whose input is connected to the output of the comparison device (12), and
- a tactile transmitting device (16) whose input is connected to the output of the information determining device (15) and provides tactile input to the driver of the vehicle.

18. A device for monitoring the movement of a vehicle on a path according to claim 17, wherein said tactile transmitting device (16) includes a wheel brakes actuation device (25) whose input is connected to the output of the comparison device (12).

19. A device as claimed in claim 17, wherein the comparison device (12) includes a desired movement determining device (13) whose input is connected to the output of the desired path determining device (10), and a movement difference determining device (14) whose inputs are connected to the outputs of the desired movement determining device (13) and of the actual movement determining device (11).

20. A device as claimed in claim 17, wherein the comparison device (12) includes an extrapolation device (23) whose input is connected to the output of the actual movement determining device (11), and a path difference determining device (24) whose inputs are connected to the outputs of the extrapolation device (23) and the desired path determining device (10).

21. A device as claimed in claim 17, wherein the transmission device (16) is arranged on the steering wheel (30) of the vehicle.

22. A device as claimed in claim 21, wherein the transmitting device (16) includes a piezoelectric foil.

23. A device as claimed in claims 21, wherein the transmission device (16) includes an electrorheologic fluid.

24. A device as claimed in claim 18 wherein the comparison device (12), the information determining device (15) or the wheel brakes actuation device (25) includes a fuzzy control logic.

25. A device as claimed in claim 17, wherein the desired path determining device (10) includes an optical sensor and an evaluating device connected to said sensor.

26. A device as claimed in claim 17, wherein the actual movement determining device (11) includes at least one device selected from the group consisting of a wheel sensor, a steering angle sensor, an acceleration sensor, and a yaw rate sensor.

* * * * *